United States Patent
Ben-Amos et al.

(10) Patent No.: US 10,375,214 B2
(45) Date of Patent: *Aug. 6, 2019

(54) EMULATING FICON OVER IP

(71) Applicant: INTERNATIONAL BUSINESS MACHINES CORPORATION, Armonk, NY (US)

(72) Inventors: Eitan Ben-Amos, Pardes Hanna-Karkur (IL); Maor Ben-Dayan, Tel Aviv (IL); Gary Weiss, Tel Aviv (IL)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/830,474

(22) Filed: May 3, 2013

(65) Prior Publication Data

US 2013/0219077 A1 Aug. 22, 2013

Related U.S. Application Data

(63) Continuation of application No. 13/220,375, filed on Aug. 29, 2011.

(51) Int. Cl.
*G06F 15/16* (2006.01)
*H04L 29/06* (2006.01)
*H04L 29/08* (2006.01)

(52) U.S. Cl.
CPC .......... *H04L 69/16* (2013.01); *H04L 67/1097* (2013.01)

(58) Field of Classification Search
CPC ..... H04L 29/00; H04L 67/1097; H04L 69/16; H04L 29/08549; H04L 69/00; H04L 67/00

USPC .......... 709/228, 230, 231, 232, 223
See application file for complete search history.

(56) References Cited

U.S. PATENT DOCUMENTS

| | | | | |
|---|---|---|---|---|
| 5,606,679 | A * | 2/1997 | Cohn et al. | 711/4 |
| 7,460,473 | B1 * | 12/2008 | Kodama et al. | 370/230 |
| 7,673,074 | B1 * | 3/2010 | Sebastian et al. | 709/250 |
| 7,702,762 | B1 * | 4/2010 | Jagana | H04L 67/1097 370/466 |
| 8,635,416 | B1 * | 1/2014 | de la Iglesia | G06F 3/061 711/154 |
| 2011/0107023 | A1 * | 5/2011 | McCallister et al. | 711/111 |
| 2012/0093149 | A1 * | 4/2012 | Blair et al. | 370/389 |
| 2012/0278804 | A1 * | 11/2012 | Narayanasamy et al. | 718/1 |

OTHER PUBLICATIONS

The SAN Connectivity Company, "FICON Over Distance", 2008.*
James Long, 2006, Cisco Press, vol. 2, "Storage Networking Protocol Fundamentals", sub-section: FCIP operational detail, http://flylib.com/books/en/2.695.1.67/1/.*
"EMC Enginuity 5874 Enhancement for symmetric V-Max Mainframe Environments", Nov. 2009.*

(Continued)

*Primary Examiner* — Melvin H Pollack
*Assistant Examiner* — Messeret F Gebre
(74) *Attorney, Agent, or Firm* — Griffiths & Seaton PLLC

(57) ABSTRACT

A Fiber Connection (FICON) information unit is received by a host processor executing a host internet protocol (IP) software library. The FICON information unit is written to a transport layer. Data including the FICON information unit is then transmitted to a storage control unit over an IP network.

7 Claims, 2 Drawing Sheets

(56) References Cited

OTHER PUBLICATIONS

D. Brent Chapman & Elizabeth D. Zwicky; First Edition, Nov. 1995, "Building Internet Firewalls", Sub-Section: Chapter 6—Packet Filtering, https://docstore.mik.ua/orelly/networking/firewall/ch06.*
Schulz, Greg. Resilient Storage Networks. 2004, pp. 132.*
J. Chen, L. Yuan and G. Zhou, "TS-A: A Hierarchy Extended Cellular Automata Model for Complex Networking Storage System," 2009 IEEE International Conference on Networking, Architecture, and Storage, Hunan, pp. 261-264, 2009. (Year: 2009).*
A. G. Dimakis, P. B. Godfrey, Y. Wu, M. J. Wainwright and K. Ramchandran, "Network Coding for Distributed Storage Systems," in IEEE Transactions on Information Theory, vol. 56, No. 9, pp. 4539-4551, Sep. 2010. (Year: 2010).*
Hakim Weatherspoon, "Gossiping Over Storage Systems is Practical", pp. 75-81, 2007. (Year: 2007).*
El-Gorashi, T. E. H., "Optical Storage Area Networks", pp. 285-302, 2009. (Year: 2009).*
Stephen Swoyer, "Cisco SAN Switches Qualified for IBM Mainframes—Switches connect mainframe systems via IP-based SANs," www.esj.com, May 11, 2004, 9 pages.
Chapman et al., "Building Internet Firewalls," Sub-Section: Chapter 6—Packet Filtering, https://docstore.mik.ua/orelly/networking/firewall/ch06, First Edition, Nov. 1995 (17 pages).
"EMC Ingenuity 5874 Enhancement for symmetric V-Max Mainframe Environments," Nov. 2009 (14 pages).
Long, "Storage Networking Protocol Fundamentals," sub-section: FCIP operational detail, http://flylib.com/books/en/2.695.1/1/, Cisco Press, vol. 2, 2006 (18 pages).

* cited by examiner

EMULATING FICON OVER IP

CROSS REFERENCE TO RELATED APPLICATIONS

This application is a Continuation of U.S. patent application Ser. No. 13/220,375, filed on Aug. 29, 2011.

FIELD OF THE INVENTION

This invention relates generally to computer storage, and specifically to conveying Fibre Connection (FICON) information units over an Internet Protocol (IP) network.

BACKGROUND OF THE INVENTION

In computer networking, a protocol stack comprises a prescribed hierarchy of software layers, starting from the application layer at the top (the source of the data being sent) to the physical layer at the bottom (transmitting the bits on the wire). Elements of the protocol stack include an application layer, a transport layer, a network layer, a data-link layer and a physical layer.

The application layer comprises a software application closest to a user, supports network access, and provides services for user applications.

The transport layer is responsible for conveying data across a network from a source to a destination. Examples of transport layers include Transmission Control Protocol (TCP), User Datagram Protocol (UDP) and Stream Control Transmission Protocol (SCTP).

The network layer enables transferring data from a source to a destination host via one or more networks. The network layer identifies the addresses of neighboring nodes in the network, packages data with network address information, selects routes and quality of service, recognizes incoming messages for local host domains, and forwards the incoming messages to the transport layer. Internet Protocol (IP) is an example of a network layer.

The data-link layer is the protocol layer which handles the moving of data across a physical link (i.e., layer) in a network. The data-link layer divides output data into data frames, and handles the acknowledgements from a receiver that the data arrived successfully. The data-link layer also ensures that incoming data has been received successfully by analyzing bit patterns at special places in the frames. Examples of data link layers include Ethernet, and Fiber Distributed Data Interface (FDDI).

Finally, the physical layer consists of the basic hardware transmission technologies of a network. The physical layer defines how raw bits (rather than logical data packets) are transmitted over a physical link (i.e., connecting network nodes). Physical layer devices just take messages (i.e., input bits) and convey them as output, and typically have no knowledge of the contents of the messages. Examples of physical layer devices include repeaters, hubs, transceivers and network media.

SUMMARY OF THE INVENTION

There is provided, in accordance with an embodiment of the present invention a method, including receiving a Fibre Connection (FICON) information unit by a host processor, executing a host internet protocol (IP) software library, writing the FICON information unit to a transport layer, and transmitting data including the FICON information unit to a storage control unit over an IP network.

There is also provided, in accordance with an embodiment of the present invention an apparatus, including a host memory, and a host processor coupled to the host memory, and configured to receive a Fibre Connection (FICON) information unit, to write the FICON information unit to a transport layer, and to transmit data including the FICO information unit to a storage control unit over an IP network.

There is further provided, in accordance with an embodiment of the present invention a computer program product, the computer program product including a non-transitory computer readable storage medium having computer readable program code embodied therewith, the computer readable program code including computer readable program code executing on a host processor and configured to write a FICON information unit received by the host processor to a transport layer, and computer readable program code executing on the host processor and configured to transmit data including the FICON information unit to a storage control unit over an internet protocol (IP) network.

There is additionally provided, in accordance with an embodiment of the present invention a method, including receiving from an IP network, data including a Fibre Connection (FICON) information unit by a storage processor of a storage control unit executing a storage internet protocol (IP) software library, and extracting the FICON information unit from a transport layer.

BRIEF DESCRIPTION OF THE DRAWINGS

The disclosure is herein described, by way of example only, with reference to the accompanying drawings, wherein.

DETAILED DESCRIPTION OF EMBODIMENTS

Overview

Figure 1:
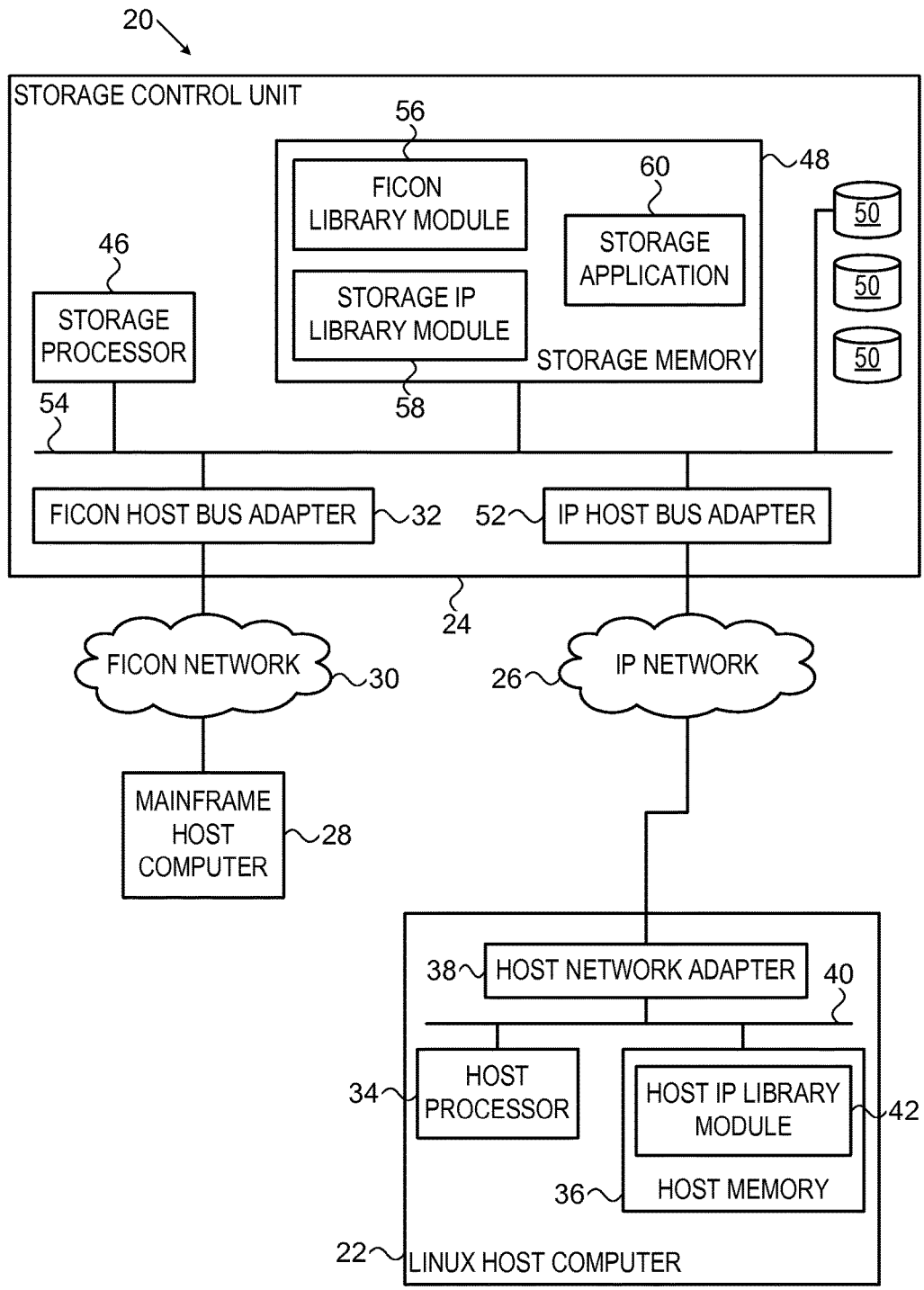
FIG. 1 is a schematic pictorial illustration of a system configured to convey Fibre Connection (FICON) information units over an Internet Protocol (IP) network, in accordance with an embodiment of the present invention.

Mainframe data centers typically implement high speed Fibre Connection (FICON) networks that are local to the data center, where FICON comprises the transport layer of the protocol stack. Computing devices on the FICON network include mainframe computers and storage control units.

When communicating over FICON networks, mainframe computers can interact with storage systems by conveying FICON information units to the storage system. FICON information units typically comprise Count Key Data (CKD) commands, Single Byte-4 (SB-4) commands, and FICON commands. CKD is an application layer protocol, and comprises commands that manage CKD volumes on CKD storage devices. CKD commands are also referred to as channel command words (CCW) and typically comprise one or more FICON information units. To convey CKD commands, FICON networks typically use the SB-4 mapping protocol. The SB-4 mapping protocol can create logical paths for CKD commands, so that multiple independent CKD streams can be issued independently over a FICON network. In other words, CKD operates over SB-4, which is transported by FICON.

Embodiments of the present invention enable an application executing on a host computer to convey FICON information units to a storage control unit via an internet protocol (IP) network, thereby defining FICON semantics over an IP connection. In some embodiments, an application executing on a host computer issues a FICON information unit (e.g., via an Application Programming Interface call), and a host IP library module executing on the host computer receives the FICON information unit, writes the FICON information unit to a transport layer, and transmits data that includes the FICON information unit to a storage control unit via an IP network. After the storage control unit receives the data including the FICON information unit from the IP network, a storage IP library executing on the storage control unit extracts the FICON information unit from the received data.

For example, an application executing on a host computer calls a CKD command ckd_chn_establish_logical_path( ), which is typically used to create a logical path between the host computer and a storage device coupled to a storage control unit. The host computer and the storage control unit are coupled via an IP network. A host processor on the host computer receives the CKD command called by the application, writes the CKD command to a TCP transport layer, and transmits data including the CKD command to the storage control unit over the IP network. Since TCP data is typically encapsulated in an IP datagram, the IP datagram may include additional data such as inter-process messages, file transfer protocol (FTP) data, or any other application layer data.

Continuing the example, a storage processor on the storage control unit receives the transmitted data that includes the ckd_chn_establish_logical_path( ) CKD command, extracts the CKD command from the TCP transport layer, and conveys the CKD command to a storage application that is configured to manage storage devices on the storage control unit. Finally, the storage application creates a logical path between the host computer and a given storage device on the storage control unit.

In addition to being coupled to an IP network, the storage control unit may be also coupled to a FICON network, and execute a FICON library module configured to receive FICON information units received from the FICON network. Therefore, the storage control unit can be agnostic to the source (i.e., IP or FICON) of the FICON information units. In other words, applications (e.g., a storage application processing input/output requests) executing on the storage control unit process FICON information units in the same manner, regardless of which network conveyed the FICON information units.

Since connecting to an IP network is typically significantly less expensive than connecting to a FICON network, embodiments of the present invention enable a variety of host computing devices located in a variety of locations to directly access current (i.e., not archived) CKD storage volume data via IP networks. Additionally, IP traffic between the host computing devices and the CKD storage volume may travel over multiple networks, including wireless and/or virtual private networks. For example, using embodiments of the present invention, software developers at a remote development site can directly access CKD volume data using International Business Machines' System z® Personal Development Tool (zPDT) (produced by IBM Corporation, Armonk, N.Y.), while a marketing professional can directly access marketing data stored on the CKD volume wirelessly via a smartphone.

System Description

FIG. 1 is a schematic pictorial illustration of a system 20 configured to convey FICON information units from a Linux™ host computer 22 to a storage control unit 24 over an IP network 26, in accordance with an embodiment of the present invention. Storage control unit 24 can also communicate with a mainframe host computer 28 over a FICON network 30, via a FICON host bus adapter (HBA) 32. The particular subsystem shown in FIG. 1 is presented to facilitate an explanation of the invention. However, as the skilled artisan will appreciate, the invention can be practiced using other computing environments, such as other storage subsystems with diverse architectures and capabilities.

Storage control unit 24 receives, from host computers 22 and 28, input/output (I/O) requests, which are commands to read or write data at logical addresses on logical volumes. In addition to host computers 22 and 28, any number of additional host computers (not shown) may be coupled to storage control unit 24 by any means known in the art, for example, using networks 26 and 30. Herein, by way of example, host computer 22 and storage control unit 24 are assumed to be coupled by IP network 26, and mainframe host 28 and the storage control unit are assumed to be coupled by FICON network 30.

The logical addresses specify a range of data blocks within a logical volume, each block herein being assumed by way of example to contain 512 bytes. For example, a 10 KB data record used in a data processing application on a host computer would require 20 blocks, which the host computers might specify as being stored at a logical address comprising blocks 1000 through 1019 of a logical volume. Storage control unit 24 typically operates in, or as, a network attached storage (NAS) or a SAN system (both not shown).

In some configurations, storage control unit 24 may comprise multiple sets of storage devices 50. Each set of storage devices 50 comprises multiple slow and/or fast access time mass storage devices, herein below assumed to be multiple hard disks. Typically, the sets of storage devices 50 comprise one or more disks, which can have different performance characteristics.

Routing records, indicating the association of logical addresses of logical volumes with partitions and the association of the partitions with caches, are distributed by the storage control unit to either FICON Host bus adapter 32 and IP Host Bus Adapter 52 (both referred to herein as the network interfaces). It will be understood that system 20, and thereby, storage control unit 24, may comprise any convenient number of the network interfaces. Subsequent to the formation of storage devices 50, the network interfaces receive I/O commands from host computers 22 and 28 specifying logical addresses of storage devices 50. The network interfaces use the routing records to break the commands into I/O instructions, or command subsets, that are then distributed among caches (not shown) in the storage control unit.

Storage control unit 24 is operative to monitor its state, and to transmit configuration information to other components of system 20, for example, configuration changes that result in blocking intervals, or limit the rate at which I/O requests for the sets of storage devices 50 are accepted.

Data having contiguous logical addresses are generally distributed among the storage devices. Alternatively, the data can be distributed using other algorithms, e.g., byte or block interleaving. In general, this increases bandwidth, for instance, by allowing a volume coupled via the (IP and FICO) networks, or a file in network attached storage to be read from or written to more than one disk at a time. However, this technique requires coordination among the various disks, and in practice may require complex provisions for disk failure, and a strategy for dealing with error checking information, e.g., a technique for storing parity information relating to distributed data. Indeed, when logical unit partitions are distributed in sufficiently small granularity, data associated with a single logical unit may span all of storage devices 50.

While not explicitly shown for purposes of illustrative simplicity, the skilled artisan will appreciate that in some embodiments, storage control unit 24 may be adapted for implementation in conjunction with certain hardware, such as a rack mount system, a midplane, and/or a backplane. Additional hardware such as the aforementioned switches, processors, controllers, memory devices, and the like may also be incorporated into storage control unit 24 and elsewhere within the system 20, again as the skilled artisan will appreciate. Further, a variety of software components, operating systems, firmware, and the like may be integrated.

Linux™ Host computer 22 comprises a host processor 34, a host memory 36, and a host network adapter 38, all coupled via a bus 40. Host computer 22 communicates with IP network 26 via host network adapter 38. While FIG. 1 shows Linux™ host computer 22 configured to convey FICON information units to storage control unit 24 over IP network 26, other types of host computers executing other operating systems (e.g., Windows™) may also be configured to convey FICON commands over the IP network using embodiments described herein, and are thus considered to be within the spirit and scope of the present invention.

As described in further detail hereinbelow, host processor 34 executes a host IP library module 42 that is configured to write FICON information units to a transport layer, and to transmit data including the FICON information units to storage control unit 24 over IP network 26. Host IP library module 42 may comprise a software library written in C that implements an application programming interface (API) configured to enable applications executing on the host processor to call CKD read/write functions. In some embodiments, Host IP library module 42 may comprise an additional software layer that exposes the API to scripting languages such as Python and JavaScript.

Host IP library module 42 can be configured to handle FICON semantics such as opening exchanges, fragmenting channel command words into information units and defragmenting the replies, generating automatic SB-4 commands for non exceptional channel-programs, and handling multiple connection to one or more storage devices. Since the host IP library module can handle FICON semantics, applications executing on Linux™ host computer 22 can operate at a channel command word level without being aware of the underlying SB-4, IP channel & FICON semantics running underneath.

In some instances, IP and FICON define overlapping or contradicting capabilities. An example of an overlapping capability is that FICON typically uses Cyclic Redundancy Check 32 (CRC32) signatures to verify conveyed data, while IP typically uses checksum signatures. An example of a contradicting capability is that TCP is stream oriented and does not require fragmentation, while FICON utilizes sequences and information units. Therefore, host IP library module 42 can simulate FICON behavior by fragmenting each CCW into multiple FICON information units, even though the host IP library module can convey the whole CCW over the IP channel as is (i.e., as a single CCW). Additionally, host IP library module 42 pads and adds CRC signatures to transport data segments, while IP data is typically protected by the IP layer.

Storage control unit 24 comprises FICON HBA 32, a storage processor 46, a storage memory 48, CKD storage devices 50, and an IP HBA 52, all coupled via a bus 54. Storage processor 46 executes a FICON library module 56, a storage IP library module 58, and a storage application 60 from storage memory 48, and communicates with IP network 26 via IP HBA 52.

Storage application 60 is configured to process input/output (I/O) requests (conveyed via a FICON information unit), transfer data from/to CKD storage devices 50, and convey the result of the I/O requests (e.g., an acknowledgement of a write operation, or the retrieved data of a read operation) to host computers 22 and 28 via their respective networks. CKD storage devices 50 typically comprise a combination of high capacity hard disk drives and solid-state disk drives.

In operation, FICON library module 56 is configured to receive FICON information units from mainframe host 28 via FICON network 30, and to transmit the FICON information units to storage application 60. As described in further detail hereinbelow, storage IP library module 58 is configured to extract the FICON information unit from data received from host computer 22 via IP network 26, and to convey the FICON information unit to storage application 60.

In an alternative embodiment, the roles of library modules 56 and 58, and host IP library module 42 may be reversed. In other words, storage IP library module 60 can be configured to write a FICON information unit to a transport layer, and to transmit data including the FICON information unit to Linux™ host computer 22 via IP network 26, and host IP library module 42 can be configured to extract the FICON information unit from data received via host network adapter 38. Likewise, FICON library module 56 can be configured to write a FICON information unit to a transport layer, and to transmit data including the FICON information unit to mainframe host computer 28 over FICON network 30 via FICON HBA 32.

Processors 34 and 46 typically comprise general-purpose computers configured to carry out the functions described herein. Software operated by the processors may be downloaded to the memories in electronic form, over a network, for example, or it may be provided on non-transitory tangible media, such as optical, magnetic or electronic memory media. Alternatively, some or all of the functions of the processors may be carried out by dedicated or programmable digital hardware components, or by using a combination of hardware and software elements.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FICON Over IP

Figure 2:
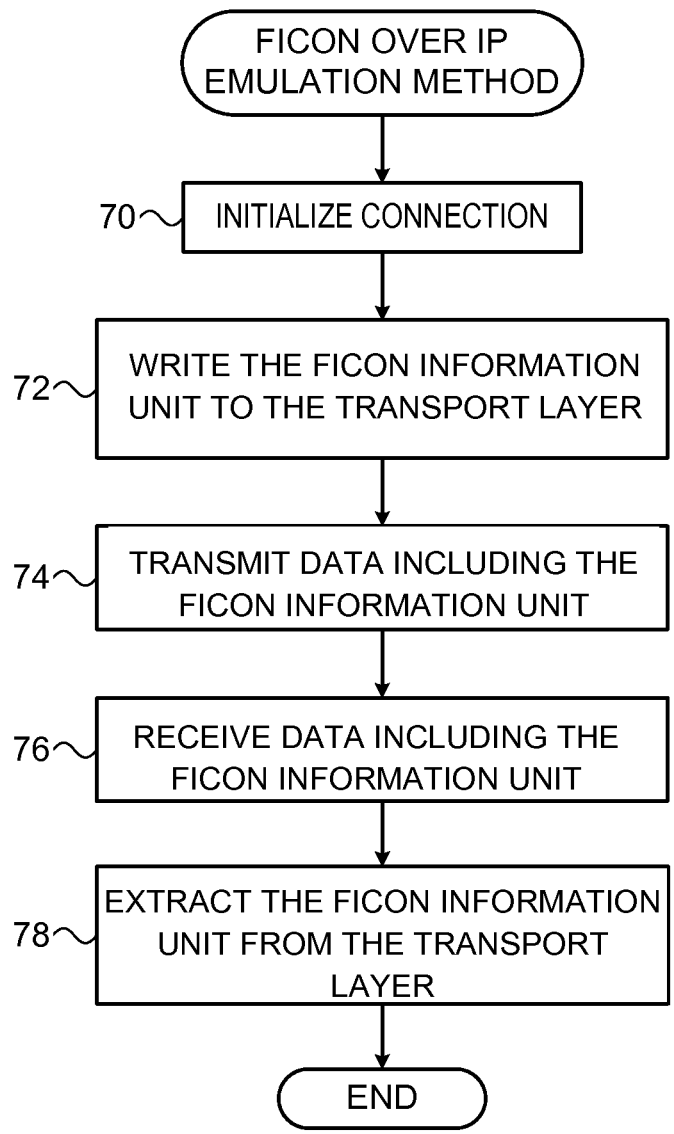
FIG. 2 is a flow diagram that schematically illustrates a method of conveying the FICON information units over the IP network, in accordance with an embodiment of the present invention.

FIG. 2 is a flow diagram that schematically illustrates a method of conveying FICON information units over IP network 26, thereby emulating FICON over IP, in accordance with an embodiment of the present invention. In an initialization step 70, host processor 34 initializes a network connection between Linux™ host computer 22 and storage control unit 24 over IP network 26. Examples of operations host processor 34 performs to initialize the connection include:

Setting one or more transport parameters. For example, host processor 34 can set parameters such as an IP address, routing ports and a domain name system (DNS) address.

Establishing an IP network connection to storage control unit 24.

Configuring host IP library 42 to receive notifications from storage control unit 24.

Upon host processor 34 receiving a FICON information unit, host IP library module 42 writes the FICON information unit to a transport layer in a write step 72. Examples of transport layers protocols include transmission control protocol (TCP), user datagram protocol (UDP), and stream control transmission protocol (SCTP).

In a transmit step 74, host processor 34 transmits data including the FICON information unit over IP network 26 to storage control unit 24, and in a receive step 76, storage processor 46 receives the data including the FICON information unit from the IP network. Finally, in an extract step 78, storage IP library module 58 extracts the FICON information unit from the transport layer, conveys the FICON information unit to an application executing on storage processor 46 (e.g., storage application 60), and the method ends.

The following table lists a sample application that uses the host IP library module's API function calls to import a CKD volume from a mainframe file (e.g., an AWS DASD file) stored on a storage device (not shown) coupled to bus 40 to a given CKD storage device 50 (i.e., from the Linux™ host computer to the storage control unit):

```
(1)   ckd_channel_init( )
(2)   ckd_storage_device_impl__init_ip( )
(3)   ckd_chn_establish_logical_path( )
(4)   do {
(5)         aws_read_track( )
(6)         write_track( )
(7)   } while (not last track)
(8)   ckd_chn_remove_logical_path( )
(9)   ckd_storage_device_impl__close
(10)  ckd_channel_terminate( )
```

In line (1), host processor 34 initializes host IP library module 42, as described in initialization step 70. In line (2), host processor 34 initializes an IP connection to storage control unit 24, and in line (3), the host processor creates a logical path for conveying the FICON information units from the Linux™ host computer to the storage control unit.

Lines (4)-(7) comprise an iterative loop that reads all the CKD tracks in the AWS file (i.e., on the Linux™ host computer), and writes the CKD tracks to the given storage device 50. In line (8), host processor 34 removes the logical channel, thereby allowing any resources allocated to the logical channel to be reused. In line (9), host processor 34 closes the IP connection to storage control unit 24, and in line (10), the host processor terminates execution of host IP library module 42, thereby freeing any resources allocated to the host IP module.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
   receiving a Fibre Connection (FICON) information unit by a host processor executing a host internet protocol (IP) software library; wherein the host computer executes the host IP software library within a Linux operating system receiving input controls from a user;
   writing the FICON information unit including a ckd_chn_establish_logical_path( ) Count Key Data (CKD) command from a storage application executing on the host processor to a transport layer;
   transmitting data comprising an IP datagram including inter-process messages, File Transfer Protocol (FTP) data, and the FICON information unit to a storage control unit over an IP network thereby encapsulating the FICON information unit within the IP datagram; and
   selecting the transport layer from a list consisting of a Transmission Control Protocol (TCP), a user datagram protocol (UDP), and a stream control transmission protocol (SCTP);
   wherein the storage control unit receives input/output (I/O) requests from multiple host computers including the host processor to read and write the data at logical addresses on logical volumes of multiple physical storage devices directly coupled to the storage control unit and wherein the storage control unit is coupled to both the IP network and a native FICON network and receives the FICON information unit over either the IP network or the native FICON network such that the storage application executing on the storage control unit processes the FICON information unit in an identical manner regardless of whether the FICON information unit was received over the IP network or the native FICON network.

2. The method according to claim 1, and comprising:
   receiving, the data including the FICON information unit from the IP network by a storage processor executing a storage IP software library; and
   extracting the FICON information unit from the transport layer.

3. The method according to claim 2, and comprising conveying the extracted FICON information unit to an application executing on the storage control unit.

4. The method according to claim 1, and comprising initializing a network connection between the host processor and the storage control unit, prior to receiving the FICON information unit.

5. The method according to claim 1, wherein the FICON information unit is selected from a list consisting of the CKD command, a Single-Byte-4 (SB-4) command, and a FICON command.

6. A method, comprising:
   receiving from an Internet Protocol (IP) network, data comprising an IP datagram including inter-process messages, File Transfer Protocol (FTP) data, and a Fibre Connection (FICON) information unit written by a host processor executing a host IP software library within a Linux operating system receiving input controls from a user, the data received by a storage processor of a storage control unit executing a storage IP software library, wherein the FICON unit is thereby encapsulated within the IP datagram;
   extracting the FICON information unit including a ckd_chn_establish_logical_path( ) Count Key Data (CKD) command received by a storage application executing on the storage processor from a transport layer; and
   selecting the transport layer from a list consisting of a Transmission Control Protocol (TCP), a user datagram protocol (UDP), and a stream control transmission protocol (SCTP);
   wherein the storage control unit receives input/output (I/O) requests from multiple host computers including the host processor to read and write the data at logical addresses on logical volumes of multiple physical storage devices directly coupled to the storage control unit and wherein the storage control unit is coupled to both the IP network and a native FICON network and receives the FICON information unit over either the IP network or the native FICON network such that the storage application executing on the storage control unit processes the FICON information unit in an identical manner regardless of whether the FICON information unit was received over the IP network or the native FICON network.

7. The method according to claim 6, and comprising, prior to receiving the one or more transport layer data segments:
   receiving the FICON information unit by a host processor executing a IP software library;

writing the FICON information unit to the transport layer; and transmitting the data including the FICON information unit to the storage control unit over the IP network.

\* \* \* \* \*